Patented Mar. 30, 1926.

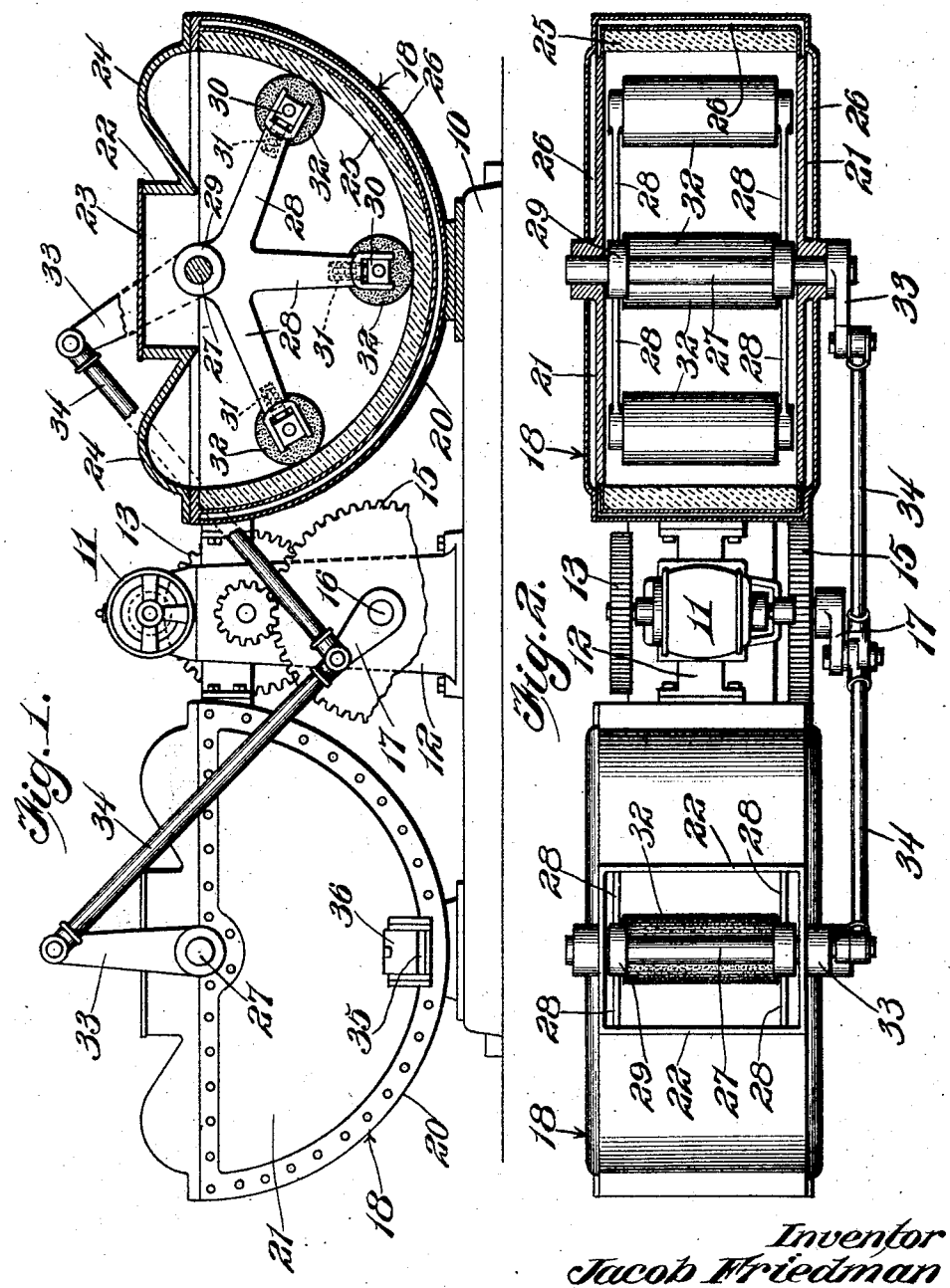

1,579,101

UNITED STATES PATENT OFFICE.

JACOB FRIEDMAN, OF NEW YORK, N. Y.

RUBBING OR KNEADING MACHINE.

Application filed August 7, 1924. Serial No. 730,753.

*To all whom it may concern:*

Be it known that I, JACOB FRIEDMAN, a citizen of the United States, residing at New York city, in the county of New York and State of New York, have invented certain new and useful Improvements in Rubbing or Kneading Machines, of which the following is a specification, reference being had to the accompanying drawings.

This invention relates to machines for rubbing, refining, mixing, kneading or smoothing plastic materials, and particularly to the machines known as "conches" which are used for rubbing, kneading and smoothing candy paste, such as chocolates, where the chocolate is being mixed with cocoa butter or like material.

In such machines the pasty mass or cocoa butter and chocolate are submitted to the action of rubbing rollers which intimately mix the cocoa butter with the chocolate and knead the plastic mass so that the cocoa butter and the chocolate are softened and kneaded into each other.

A further object is to provide a machine of this character which has a relatively great rubbing capacity, such as is necessary, which uses only a relatively small horsepower to operate it, and which is relatively compact.

A still further object is to provide a mechanism of this character wherein the plastic mass is submitted to the action of a plurality of rollers operating back and forth over a semi-circular trough or pan.

Another object is to provide a machine of this character wherein the rollers oscillate in a vertical plane and wherein the rollers give a "slap" to the mass when a roller rises above the mass of chocolate and again descends into it.

Still another object is to provide a tank in which the rollers operate, which has no corners or flat bottom in which the chocolate mass may gather without being operated on by the rollers.

Other objects will appear in the course of the following description.

My invention is illustrated in the accompanying drawings, wherein:—

Figure 1 is a side elevation of a rubbing or kneading machine constructed in accordance with my invention, one of the tanks being in longitudinal section;

Figure 2 is a top plan view of the same partly in section.

Referring to these drawings, it will be seen that I have illustrated two conche machines disposed in tandem relation and on a common bed 10 and operated from a common motor 11. This motor is mounted upon a post or support 12 and is geared to a gear wheel 13 also mounted upon this post, the shaft of which in turn carries a pinion engaging the gear wheel 15 mounted upon a shaft 16, this shaft carrying a crank arm 17.

Disposed upon the common bed, as before remarked, are the two tanks of the conche machine, the tanks being semi-circular in longitudinal section and each tank being designated generaly 18. Each tank has a semi-circular bottom 20 and vertical sides 21. There is a cover for each tank which has an area in plan the area of the tank, each cover having a central opening defined by upstanding walls 22 having a lid 23, and each cover from the bases of the transverse walls extending upward and over in a curve, as at 24, and then extending straight outward horizontally to the edge of the tank.

I do not wish to be limited to any particular manner of constructing these covers, as they may be termed, but the covers will be ordinarily permanently mounted upon the tanks, the lids being capable of being opened up so as to permit batches of chocolate or other materials to be disposed within the tank. The tank is lined by a lining 25 of granite, where particularly fine candy is to be made, though this lining 25 may be made of steel where ordinary candy is to be worker. The sides and bottom of the tank are formed to provide a steam jacket 26 so that the contents of the tank may be kept hot.

Extending through the side walls of the tank adjacent its upper end is a shaft 27 upon which are mounted three pairs of arms 28, these pairs of arms being formed as a single casting with a hub or sleeve 29 which surrounds the shaft 27. The outer ends of these pairs of arms 28 carry bearing boxes 30 operating in forks in the extremities of the arms, these bearing boxes being urged outward by springs 31. Mounted in the bearing boxes are the trunnions or rollers 32. These rollers may be of granite or of steel and for kneading fine material as, for instance, fine chocolates, they are preferably of granite.

Mounted upon the shaft 27 exteriorly of the tank is an arm 33 which is connected by a link 34 to the crank 17. Preferably there are two of these tanks disposed in line with each other and on the same bed 10, as heretofore described, and each tank is constructed in precisely the same manner and each has a link 34 which is connected to the crank 17 so that the one motor does for two tanks and the one motor will cause the oscillation of the rollers in the respective tanks in the same direction. These rollers as they roll over the surface of the granite bed or lining 25 knead and work the mass of chocolate and cocoa butter in the usual and well known manner so as to soften the same, render it pasty, and thoroughly mix and intermingle the cocoa butter with the chocolate until the mass becomes fine-grained and smooth. Each of the tanks is provided with an opening 35 closed by a door 36 whereby the chocolate or other material, after being thoroughly mixed and kneaded, may be withdrawn.

In the operation of this device, when either of the end rollers move up to their highest positions and then move down again, a slap is administered to the chocolate, which adds materially to the mixing and refining of the same and the weight of the material helps to bring the rollers down on either end. This saves power. The usual conche or refining machine on the market with a capacity of two tons of chocolate mass requires from twenty to thirty horsepower, whereas a machine constructed in accordance with my invention having the same capacity requires only seven and a half horsepower at the most. The machines first above referred to require a space of ten to thirty-three feet to operate in, whereas my improved conche machine requires a space of only eighteen feet by six feet. The ordinary machine for this purpose has a single roller operating on a flat base or bottom and such a machine requires an average of seventy-two hours at a steady run without stopping to accomplish the desired refining and to give the material the smoothness required for fine chocolates, such as milk chocolate or plain chocolate of high quality. The average machine of this type in actual use has a rubbing capacity of 120″ per square foot, while my improved machine has a rubbing capacity of 462″ per square foot. With my machine relatively cheap grades of goods may be finished in ten hours and goods of fine quality in twenty-two hours. Other conche machines known to me and on the market will take for the same work thirty-two and seventy-two hours respectively. In my machine, a slap is given to the mass as the rollers move downward after pasing up into the upper bulged portion of the cover which is equal to a thousand-pound hammer blow, while other conche machines have a slap of only four hundred pounds. Inasmuch as my tank is made semi-circular, there are no corners or flat bottoms where the candy may collect and not be acted upon by the rollers. With my machine, the whole mass is equally refined or rubbed down and the tanks are readily cleaned.

The tanks are intended to ordinarily hold one ton of chocolate mass in each tank. The machine is started and this chocolate mass is put into the machine either in paste form or powder form, and when put in powder form the heat from the jacket melts it into a kind of paste. The chocolate is fed to the machine about fifty pounds at a time and when full the machine runs from two to twenty-two hours, or possibly longer, depending upon the fineness of the paste desired.

While I have particularly designed this machine for use in the making of fine chocolates as described, I do not wish to be limited to this as it is obvious that it might be used for rubbing, refining, mixing, kneading or smoothing any other materials as, for instance, ink pastes, soaps and other plastic masses where a kneading and rubbing operation must be performed.

While I have illustrated certain details of construction which I have found to be particularly effective in actual practice, I do not wish to be limited to this as many changes might be made in these details without departing from the spirit of the invention.

I claim:—

1. A machine of the character described comprising a stationary tank having straight sides and a semi-circular bottom, a shaft extending across the tank concentric to the semi-circular bottom, a plurality of pairs of radially directed arms mounted upon the shaft and extending into the tank, each arm carrying a roller at its end substantially contacting with the bottom of the tank, each roller having a length slightly less than the width of the tank, springs yieldingly supporting the rollers on the outer ends of the arms, a cover over the top of the tank and the cover at the ends of the tank being vertically extended and then extending downward and toward the middle of the tank, and motor operated means for oscillating the shaft to carry the rollers up into said vertically extended portions of the cover to thereby give a slap to the material being treated.

2. A machine of the character described comprising a stationary tank having vertical side walls and a semi-circular bottom, a cover extending over the tank, the cover having a raised middle portion and having raised portions at its ends, the raised portions at the ends extending in a curve upward from the opposite ends of the tank and then inclining downward toward the middle of the tank, a shaft passing through the top of the tank and having a plurality of pairs of arms, each pair of arms carrying a roller substantially contacting with the bottom of the tank, means yieldingly urging said rollers toward the bottom of the tank, and means for oscillating the shaft to cause the rollers to traverse the bottom of the tank and the end rollers to rise at each stroke above the top of the tank and into said raised portions at the ends of the cover.

In testimony whereof I hereunto affix my signature.

JACOB FRIEDMAN.